(12) United States Patent
Hara et al.

(10) Patent No.: US 9,239,811 B2
(45) Date of Patent: Jan. 19, 2016

(54) DATA PROCESSING APPARATUS AND DATA PROCESSING METHOD

(75) Inventors: Yuji Hara, Machida (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 977 days.

(21) Appl. No.: 12/835,641

(22) Filed: Jul. 13, 2010

(65) Prior Publication Data

US 2011/0016242 A1    Jan. 20, 2011

(30) Foreign Application Priority Data

Jul. 14, 2009    (JP) ................................ 2009-165921

(51) Int. Cl.
*G06F 13/42*    (2006.01)
*G06F 15/76*    (2006.01)

(52) U.S. Cl.
CPC ............ *G06F 13/4252* (2013.01); *G06F 13/42* (2013.01); *G06F 15/76* (2013.01)

(58) Field of Classification Search
USPC ............ 710/105–107, 117, 305, 110; 712/11, 712/28
See application file for complete search history.

(56) References Cited

U.S. PATENT DOCUMENTS

| 4,982,400 | A | * | 1/1991 | Ebersole | 370/407 |
| 5,504,918 | A | * | 4/1996 | Collette et al. | 712/29 |
| 5,907,691 | A | * | 5/1999 | Faget et al. | 710/305 |
| 5,909,562 | A | * | 6/1999 | Faget et al. | 710/310 |
| 5,911,056 | A | * | 6/1999 | Faget et al. | 710/305 |
| 5,948,089 | A | * | 9/1999 | Wingard et al. | 710/107 |
| 6,005,869 | A | * | 12/1999 | Sakai et al. | 370/452 |
| 6,718,421 | B1 | * | 4/2004 | Conroy | 710/305 |
| 7,308,558 | B2 | * | 12/2007 | Arimilli et al. | 712/11 |
| 7,379,067 | B2 | * | 5/2008 | Deering et al. | 345/506 |
| 2009/0147673 | A1 | * | 6/2009 | Niigata | 370/225 |
| 2010/0293353 | A1 | * | 11/2010 | Sonnier et al. | 711/170 |
| 2011/0093644 | A1 | * | 4/2011 | Kruger et al. | 710/316 |

FOREIGN PATENT DOCUMENTS

| JP | 05-282246 A | 10/1993 |
| JP | 06-276205 A | 9/1994 |
| JP | 2518293 B2 | 7/1996 |
| JP | 2522952 B2 | 8/1996 |
| JP | 09-091262 A | 4/1997 |
| JP | 10-228445 A | 8/1998 |
| JP | 11-205366 A | 7/1999 |

* cited by examiner

*Primary Examiner* — Khanh Dang

(74) *Attorney, Agent, or Firm* — Canon USA Inc. IP Division

(57) ABSTRACT

A data processing apparatus includes a data input unit configured to input data to a ring bus, a data output unit configured to output the data input by the input unit, a first communication processing unit configured to control input of the data by the data input unit to the ring bus and to control output of the data by the data output unit, a plurality of data processing units configured to perform data processing, a plurality of second communication processing units configured to control transmission and reception of the data between the plurality of data processing units and the ring bus, and a control unit configured to independently perform initialization on the plurality of second communication processing units or the plurality of data processing units.

13 Claims, 18 Drawing Sheets

DATA PROCESSING APPARATUS AND DATA PROCESSING METHOD

BACKGROUND OF THE INVENTION

1. Field of the Invention

The present invention generally relates to data processing and, more particularly, to a data processing apparatus and a data processing method using a ring bus.

2. Description of the Related Art

Conventionally, to rapidly and efficiently realize a series of data processing such as print image processing, there is a known method in which entire data processing is divided into predetermined functions and configured as hardware. Then, the respective hardware modules are connected in a processing flow order, and the series of data processing is executed in a pipeline manner.

On the other hand, in image processing, processing can be efficiently realized by changing an order of a series of processing. For example, when an image is output to an output apparatus having a predetermined pixel number, to match the number of pixels (resolution), the resolution needs to be converted. If the input image has a larger number of pixels than the pixel number of the output apparatus, the resolution is converted on an upstream side of the processing. Although it is better to perform the processing after reducing the number of pixels, if the input image has a smaller number of pixels than the pixel number of the output apparatus, processing may be performed in a low pixel number state without converting the resolution, and it is better to convert the resolution immediately before output (downstream side).

Further, processing is also performed to convert from a predetermined space (e.g., input device space) into a standard space (e.g., 600 ppi resolution, CIELAB color space etc.). When the space is converted into a separate space (e.g., output device space), the processing order executed by a space conversion unit on an input side and an output side (order of processing such as one-dimensional look up table (LUT), matrix calculation, three-dimensional LUT etc.) is reversed. More specifically, if the processing order can be changed, the same processing module can be shared by the input side and the output side. However, in the above described data processing method, the processing order cannot be changed. Therefore, in a case like that described above, measures such as mounting an unnecessary module (i.e., a plurality of modules having the same functions) are taken, for example.

To solve the above problem, Japanese Patent Nos. 2522952 and 2518293 each discuss a method for connecting each processing module in a ring network. According to these methods, the processing order can be changed by changing a connection destination of the data on the ring network. Further, in the technique discussed in Japanese Patent No. 2518293, each of the processing modules is executed by respective processors. Therefore, the processing order can also be changed by changing the program of the respective processors.

However, on the ring networks discussed in Japanese Patents No. 2522952 and No. 2518293, compared with an output rate of a certain module, the processing of a module which receives data from the certain module is slow. When an input rate is relatively low, the module which receives the data cannot receive all pieces of the data. Consequently, slots for storing valid packets on the ring bus are occupied by the data pieces which are not received by the module. In other words, a phenomenon (deadlock) occurs in which data cannot be output to the ring bus. Once a deadlock occurs in the ring bus, it is necessary to discard all of the packets on the ring bus, initialize all of the modules, and then restrict the output (or suppress the input rate) of the module that was the cause of the deadlock. Thus, there is a problem that if there is a plurality of data paths formed on the ring bus, it is sometimes necessary to redo the processing even for a valid data path (a data path does not use the module that was the cause of the deadlock).

SUMMARY OF THE INVENTION

The present invention is directed to a technique which controls data more appropriately on a ring bus.

According to an aspect of the present invention, a data processing apparatus includes a data input unit configured to input data to a ring bus, a data output unit configured to output the data input by the input unit, a first communication processing unit configured to control input of the data by the data input unit to the ring bus and to control output of the data by the data output unit, a plurality of data processing units configured to perform data processing, a plurality of second communication processing units configured to control transmission and reception of the data between the plurality of data processing units and the ring bus, and a control unit configured to independently performs initialization on the plurality of second communication processing units or the plurality of data processing units.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
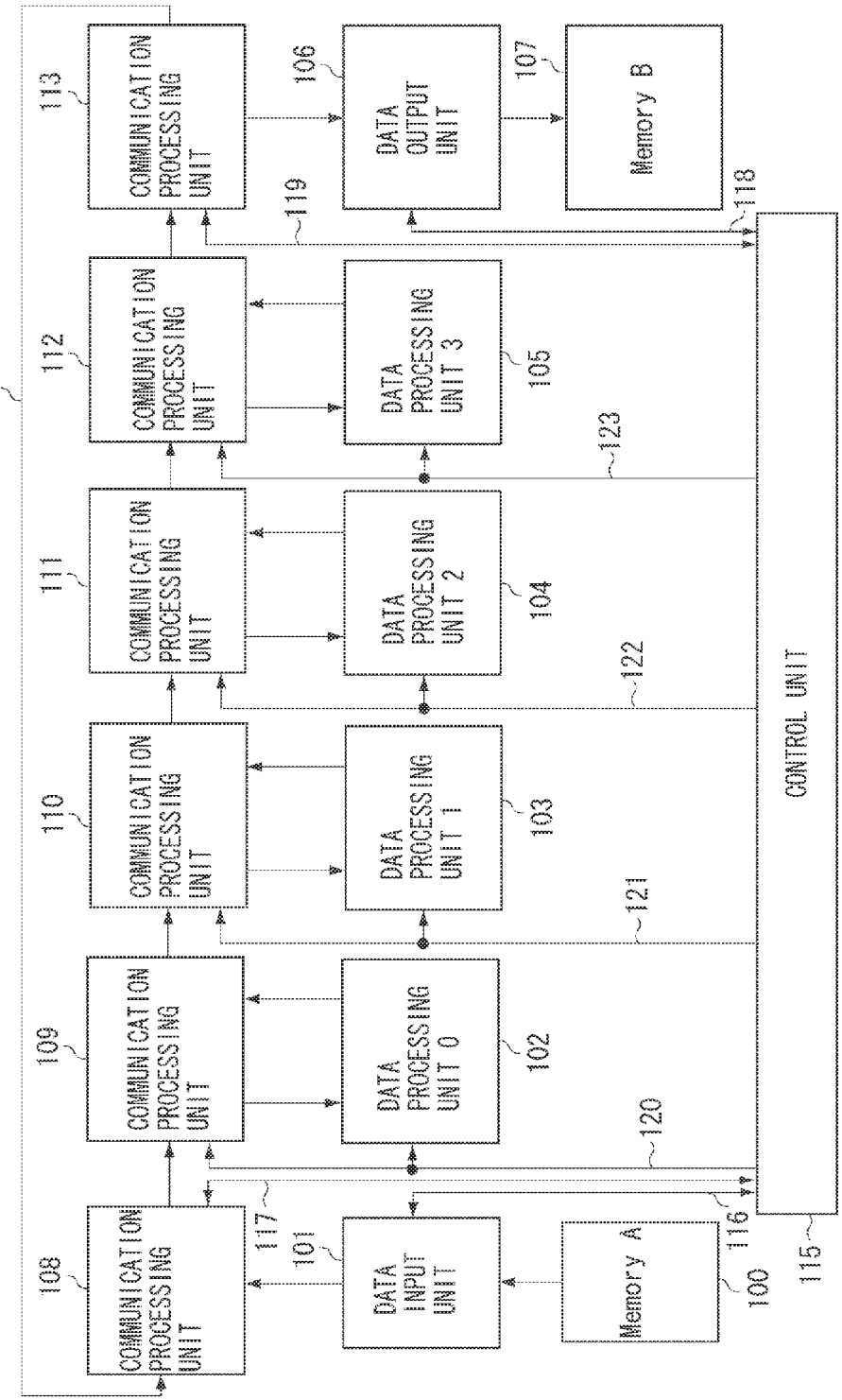
FIG. 1 illustrates a configuration of a data processing apparatus.

FIG. 1 illustrates a configuration of a data processing apparatus according to a first exemplary embodiment. In FIG. 1, a memory A 100 stores input data. A data input unit 101 reads the input data from the memory A 100. Further, the data input unit 101 also inputs a below-described data packet formed by formatting the read input data. Each of data processing units 102 to 105 performs data processing. A data output unit 106 extracts processed data from a data packet and writes the extracted data in a memory. The processed data is written in a memory B 107.

Each of communication processing units 108 to 113 controls a flow of data packets. A bus 114 is a ring bus. A control unit 115 controls the overall data processing apparatus. A control signal 116 is used to control the data input unit 101 from the control unit 115. A control signal 117 is used to control the communication processing unit 108 from the control unit 115. A control signal 118 is used to control the data output unit 106 from the control unit 115. A control signal 119 is used to control the communication processing unit 113 from the control unit 115. A reset signal 120 is used to reset the data processing unit 102 and the communication processing unit 109. A reset signal 121 is used to reset the data processing unit 103 and the communication processing unit 110. A reset signal 121 is used to reset the data processing unit 104 and the communication processing unit 111. A reset signal 123 is used to reset the data processing unit 105 and the communication processing unit 112.

Figure 2:
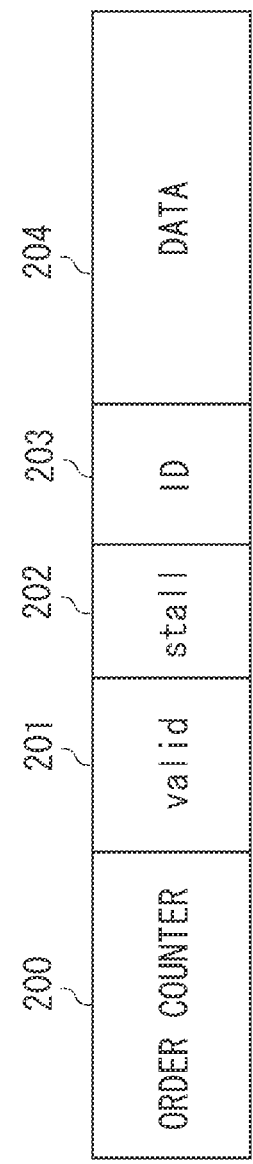
FIG. 2 illustrates a format of a data packet.

FIG. 2 illustrates a format of a data packet used in data processing by the data processing apparatus. In FIG. 2, an order counter 200 indicates an order of the data processing. A valid flag 201 indicates whether the data included in the data packet is valid data. A valid flag 201 value of "1" indicates that the data is valid, while the valid flag 201 value of "0" indicates that the data is invalid. A stall flag 202 indicates whether the data included in the data packet could not be received for some reason by the data processing unit which is supposed to perform the processing. A stall flag 202 value of "1" indicates that the data was not received, while the valid flag 201 value of "0" indicates that the data was received.

An identification (ID) 203 is an ID of the data processing unit which last processed the data packet. As will be described below, the communication processing unit associated with the data processing unit next to perform the processing compares the ID 203 and a standby ID, which will be described below (refer to the description about FIG. 3 for the details of this), and processes the data whose ID coincides with the standby ID. Further, the communication processing unit associated with the data processing unit is a communication processing unit from the communication processing units 109 to 112. In addition, the communication processing units (109, 110, 111, and 112) respectively control transmission and reception of data between the plurality of data processing units (102, 103, 104, and 105) and the ring bus 114. Data 204 is processing data.

Figure 3:
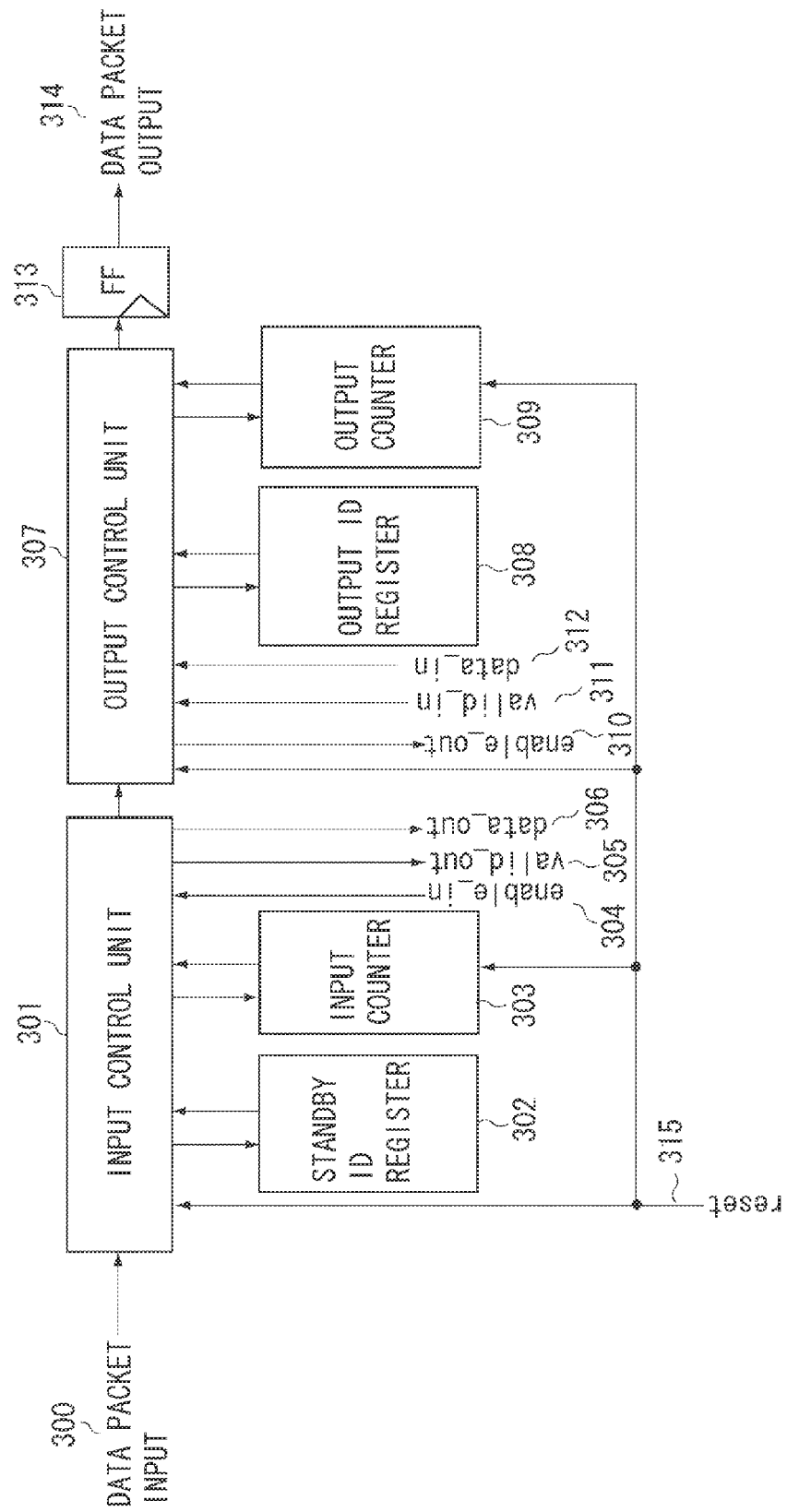
FIG. 3 illustrates a configuration of a communication processing unit.

FIG. 3 illustrates a configuration of the communication processing units (109, 110, 111, and 112) which are an example of a second communication processing unit associated with the data processing units. The communication processing unit illustrated in FIG. 3 includes a data packet input terminal 300 and an input control unit 301. The input control unit 301 analyzes a value of the order counter 200, the value of the valid flag 201, and the ID 203 in the data packet and generates the stall flag 202. Further, the input control unit 301 outputs the data packet or the data to an output control unit 307 described below or the data processing unit. A standby ID register 302 stores a value of the ID 203 of the data packet to be processed by the data processing unit which is connected to the present communication processing unit. An input counter 303 counts the number of pieces of data input to the data processing unit connected to the present communication processing unit.

When a value of a data request signal 304 (enable_in) from the data processing unit is "1", this indicates that data can be input into the data processing unit. When the value is "0", this indicates that data cannot be input into the data processing unit. A valid signal 305 (valid_out) indicates whether a data output to the data processing unit is valid. If a value of the valid_out is "1", this indicates that the data output is valid, while if this value is "0", this indicates that the data output is invalid. A data output signal 306 (data_output) is output to the data processing unit.

The output control unit 307 analyzes the valid flag 201 in the data packet from the input control unit 301, generates a data request signal (enable_out) described below, and generates a data packet to be output. Further, the output control unit 307 outputs the data packet to a flip-flop 313 described below. An output ID register 308 stores the ID of the present communication processing unit. An output counter 309 counts the number of pieces of data output by the data processing unit connected to the present communication processing unit.

If a value of a data request signal 310 (enable_out) to the data processing unit is "1", this indicates that data can be received from the data processing unit. If the value is "0", this indicates that the data cannot be received. A valid signal 311 (valid_in) indicates whether the data input from the data processing unit is valid. If a value of the valid_in is "1", this indicates that the data input is valid, while if this value is "0", this indicates that the data input is invalid. A data input signal 312 (data_in) is input from the data processing unit.

The flip-flop 313 stores the data packet from the output control unit 307. The communication processing unit includes a data packet output terminal 314. When a value of a reset signal 315 (reset) is "1", this indicates that the signal is valid. The reset signal 315 is connected to the input control unit 301, the input counter 303, the output control unit 307, and the output counter 309.

Figure 4:
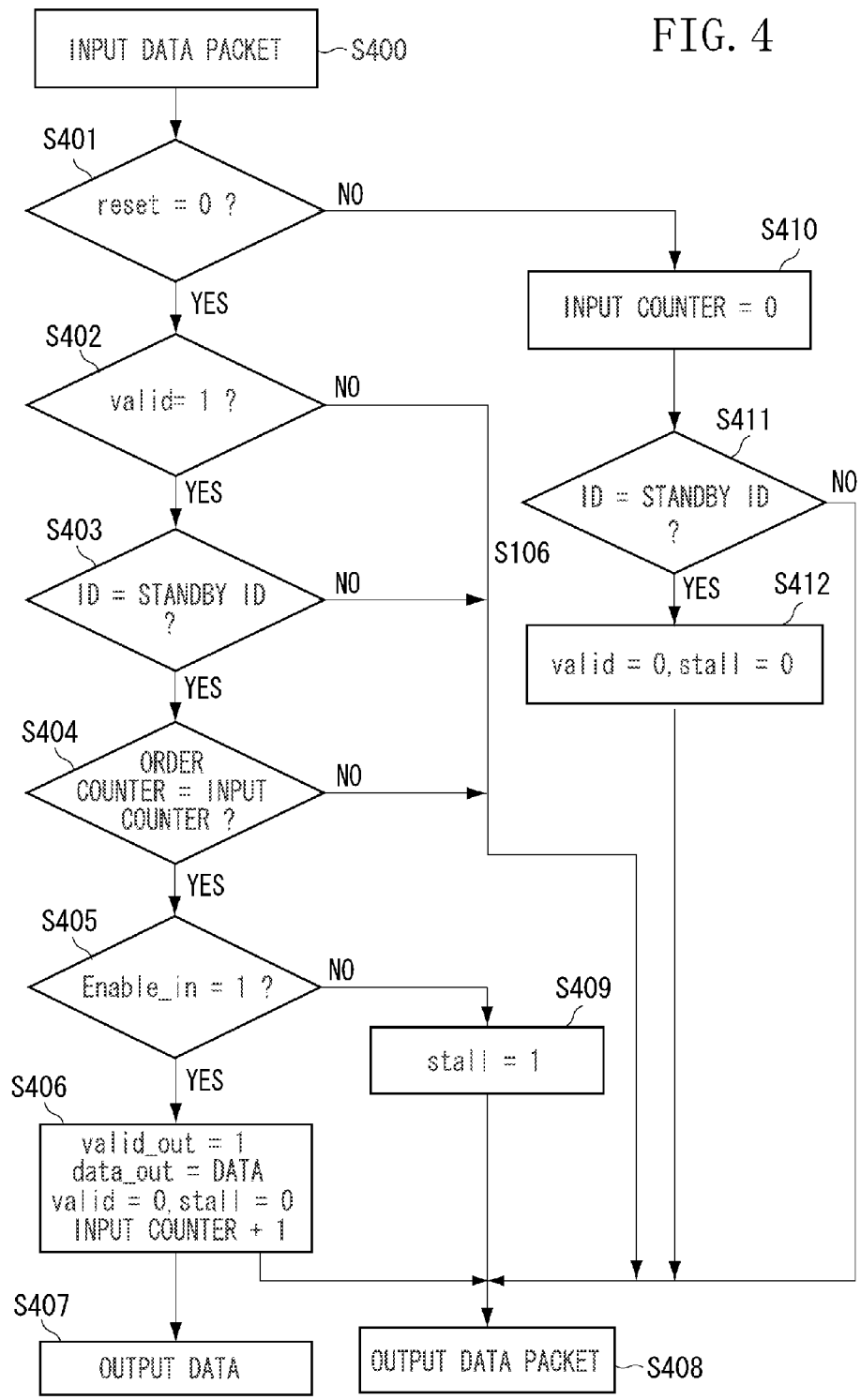
FIG. 4 is a flowchart illustrating an operation of an input control unit of a communication processing unit.
Figure 5:
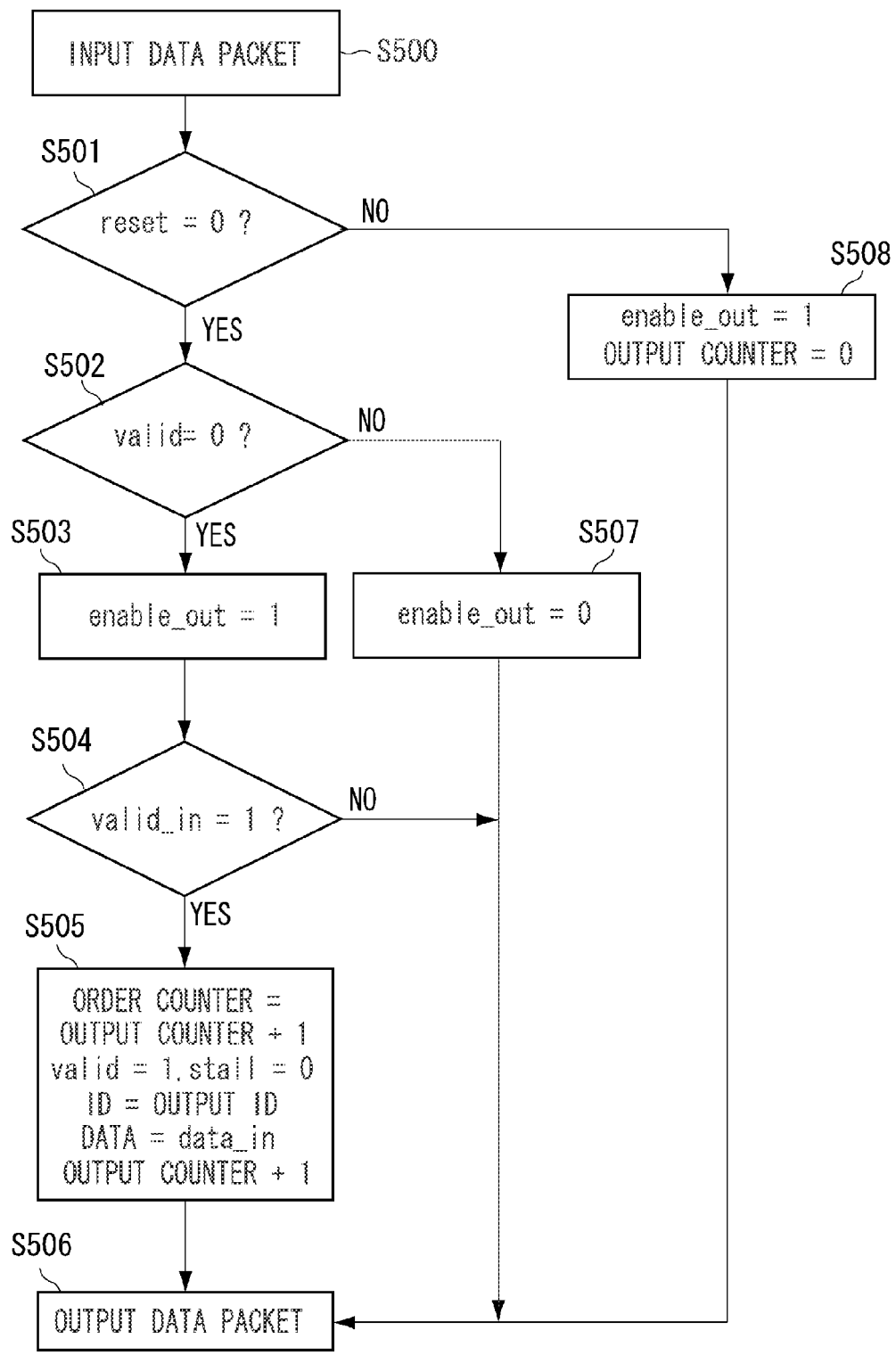
FIG. 5 is a flowchart illustrating an operation performed by an output control unit of a communication processing unit.

An operation performed by each of the communication processing units (109, 110, 111, and 112) will now be described with reference to FIGS. 4 and 5. As initial settings, the standby ID register 302 and the output ID register 308 are set by the control unit 115, and the input counter 303 and the output counter 309 are reset to "0". Because the input side controlled by the input control unit 301 and the output side controlled by the output control unit 307 are independently operated, their respective operations will be described separately.

First, the operation performed on the input side will be described below with reference to FIG. 4. In step S400, a data packet is input into the present communication processing unit from the data packet input terminal 300. At this stage, in step S401, if the value of the reset signal 315 (reset) is "0" (YES in step S401), the processing proceeds to step S402 in order for the input control unit 301 to perform a normal operation. On the other hand, if the value of the reset signal 315 (reset) is "1" (NO in step S401), the processing proceeds to step S410 in order for the input control unit 301 to perform a reset operation.

In step S402, the input control unit 301 evaluates the valid flag 201 of the data packet. If the value of the valid flag 201 is "1" (YES in step S402), the input control unit 301 determines that the data of the data packet is valid, and the processing proceeds to step S403. On the other hand, if the value of the valid flag 201 is "0" (NO in step S402), the input control unit 301 determines that the data of the data packet is invalid (e.g., the data packet is empty), and the processing proceeds to step S408. In step S408, the input control unit 301 outputs an empty data packet to the output control unit 307.

In step S403, the input control unit 301 compares values of the ID 203 of the data packet and the standby ID register 302. More specifically, the input control unit 301 determines whether the data is to be processed by the data processing unit which is connected to it own (the input control unit 301). When the values of the ID 203 of the data packet and the standby ID register 302 match (YES in step S403), the input control unit 301 determines that the data is to be processed by the data processing unit connected thereto, and the processing proceeds to step S404. On the other hand, if the values do not match (NO in step S403), the input control unit 301 determines that the data is not to be processed by the data processing unit connected thereto, and the processing proceeds to step S408. In step S408, the input control unit 301 outputs the data packet as it is to the output control unit 307.

In step S404, the input control unit 301 compares the value of the order counter 200 of the data packet and the value of the input counter 303. If these values match (YES in step S404), the input control unit 301 determines that the data is to be processed, and the processing proceeds to step S405. On the other hand, if the values do not match (NO in step S404), the input control unit 301 determines that the data is not to be processed, and the processing proceeds to step S408. In step S408, the input control unit 301 outputs the data packet as it is to the output control unit 307.

In step S405, the input control unit 301 evaluates the data request signal 304 from the data processing unit. If a value of the data request signal 304 is "1" (YES in step S405), the input control unit 301 determines that the data processing unit can receive the data, and the processing proceeds to step S406. On the other hand, if the value is "0" (NO in step S405), the input control unit 301 determines that the data processing unit cannot receive the data, and the processing proceeds to step S409. In step S409 the input control unit 301 sets the stall flag 202 of the data packet to "1". Then, in step S408, the input control unit 301 outputs the data packet to the output control unit 307.

In step S406, the input control unit 301 sets the valid signal 305 (valid_out) to "1" and outputs the data of the data packet to the data output signal 306 (data_output). Further, in step S406, processing is performed by the data processing unit. In addition, in step S406, the input control unit 301 sets the values of the valid flag 201 and the stall flag 202 to "0". Then in step S408, the input control unit 301 outputs an empty data packet to the output control unit 307. At this stage, the input control unit 301 adds "1" to the input counter 303 value.

In step S410, since the value of the reset signal 315 is "1", the input control unit 301 clears the value of the input counter 303 to "0". Next, in step S411, the input control unit 301 compares the values of the ID 203 of the data packet and the standby ID register 302. If the values match (YES in step S411), the processing proceeds to step S412. In step S412, the input control unit 301 sets the valid flag 201 and the stall flag 202 to "0", and then generates an empty data packet. More specifically, the input control unit 301 invalidates the data packet to be processed by the data processing unit, and the processing proceeds to step S408. In step S408, the input control unit 301 outputs the generated empty data packet to the output control unit 307. On the other hand, if the values do not match (NO in step S411), the input control unit 301 determines that this data is not data to be processed by the data processing unit, and the processing proceeds to step S408. In step S408, the input control unit 301 outputs the data packet as it is to the output control unit 307.

Next, the operation performed on the output side will be described below with reference to FIG. 5. In step S500, the data packet is input into the present communication processing unit from the data packet input terminal 300. At this stage, in step S501, if the value of the reset signal 315 (reset) is "0" (YES in step S501), the processing proceeds to step S502 in order for the output control unit 307 to perform the normal operation. On the other hand, if the value of the reset signal 315 (reset) is "1" (NO in step S501), the processing proceeds to step S508. In step S508, the output control unit 307 sets the data request signal 310 (enable_out) to "1" and clears the output counter 309 value to "0" to perform the reset operation. Then, in step S506, the output control unit 307 outputs the data packet as it is.

In step S502, the output control unit 307 evaluates the valid flag 201 of the data packet. If the value of the valid flag 201 is "0" (YES in step S502), the output control unit 307 determines that the data packet is empty, and the processing proceeds to step S503. In step S503, the output control unit 307 sets the data request signal 310 (enable_out) to "1". Then, the processing proceeds to step S504. On the other hand, if the value of the valid flag 201 is "1" (NO in step S502), the output control unit 307 determines that the data packet is not empty, and the processing proceeds to step S507. In step S507, the output control unit 307 sets the data request signal 310 (enable_out) to "0". Then, in step S506, the output control unit 307 outputs the data packet as it is to the flip-flop 313.

In step S504, the output control unit 307 evaluates the value of the valid signal 311 (valid_in) from the data processing unit. If the value of the valid signal 311 is "1" (YES in step S504), the output control unit 307 determines that the value of the data input signal (data_in) 312 is valid, and the processing proceeds to step S505. On the other hand, if the value is "0" (NO in step S504), the output control unit 307 determines that the value of the data input signal 312 (data_in) is invalid, and the processing proceeds to step S506. Then, in step S506, the output control unit 307 outputs the data packet as it is to the flip-flop 313.

In step S505, the output control unit 307 generates a data packet to be output. For example, the output control unit 307 sets the value of the output counter 309 as the value of the order counter 200, sets the valid flag 201 to "1", and sets the stall flag 202 to "0". Further, the output control unit 307 sets the ID 203 to the output ID register 308 value, and sets the value of the data input signal 312 (data_in) to the data 204. Then, in step S506, the output control unit 307 outputs the generated data packet to the flip-flop 313, and adds "1" to the output counter 309 value.

The data packet input into the flip-flop 313 is delayed by one clock, and then output to a subsequent communication processing unit via the data packet output terminal 314.

Figure 6:
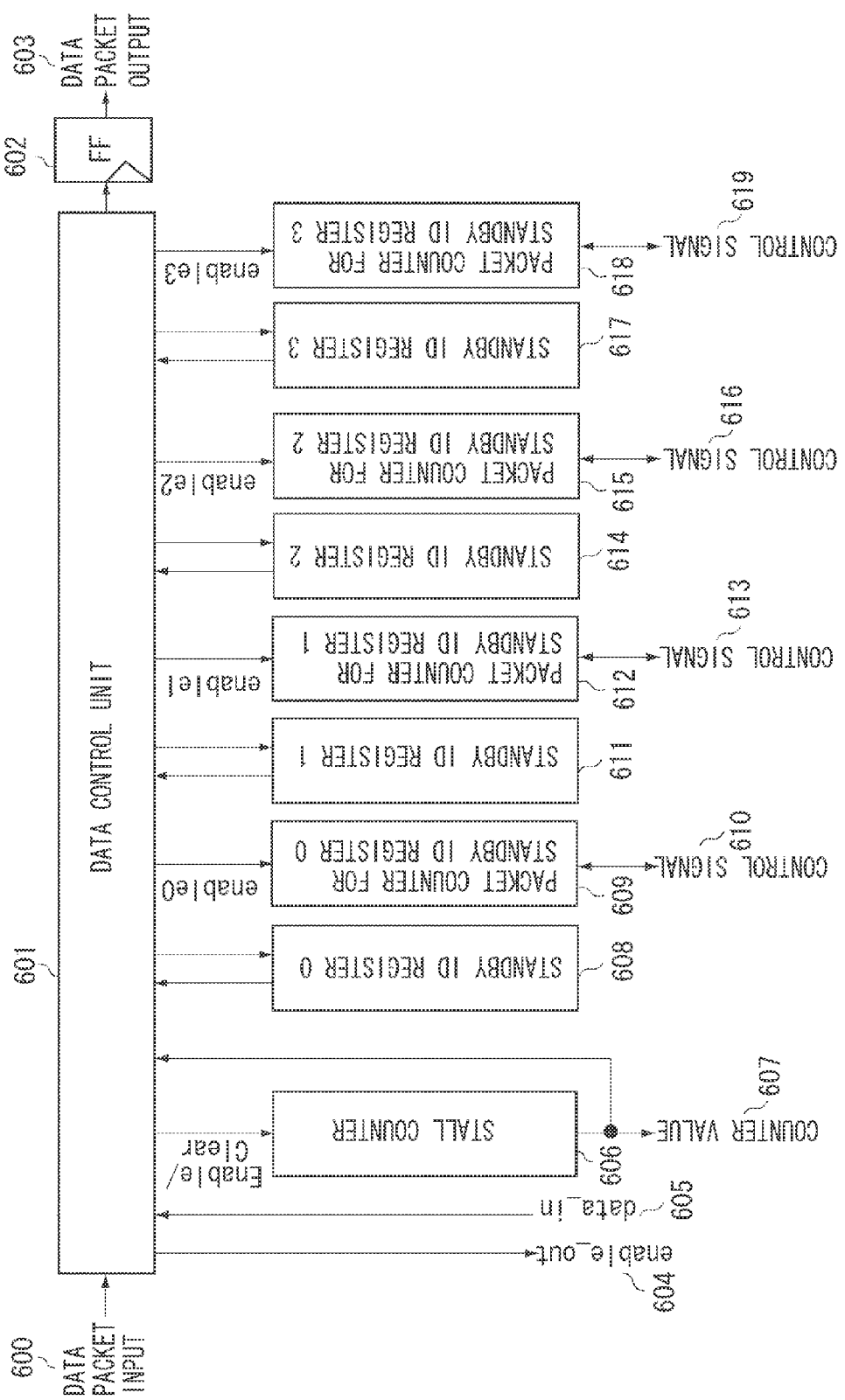
FIG. 6 illustrates a configuration of a communication processing unit.

FIG. 6 illustrates a configuration of the communication processing unit 108 which is an example of a first communication processing unit. The communication processing unit 108 includes a data packet input terminal 600 and a data control unit 601. The data control unit 601 selects a data packet from the ring bus 114 and the data input unit 101, and outputs the selected data packets to a flip-flop 602 described below. Further, if the value "1" of the stall flag 202 of the data packet input from the ring bus 114 continues for a plurality of clock cycles, the data control unit 601 outputs an enable signal with a value of "1" to a stall counter 606 described below.

In addition, the data control unit 601 outputs the enable signal with the value of "1" to each of packet counters 609, 612, 615, and 618 which are described below. This output is performed when the ID 203 of the data packet input from the ring bus 114 is the same as the value of the ID stored in below described standby ID registers 608, 611, 614, and 617, and the stall counter 606 value is "6". However, the data control unit 601 is constantly observing the value of the ID 203 of the data packet input from the ring bus 114 and the value of the order counter 200. Therefore, the enable signal with the value of "1" is output only during a period while the data packet input into the data control unit 601 travels once around the ring bus and comes back to the data control unit 601 when the value of the stall counter 606 is "6". More specifically, for the second and subsequent laps, the value of the enable signal is "0".

The flip-flop 602 stores the data packet from the data control unit 601. The communication processing unit includes a data packet output terminal 603. If a value of a data request signal 604 (enable_out) to the data input unit 101 is "1", this indicates that the data from the data input unit 101 can be input, while if this value is "0", this indicates that the data cannot be input. A valid signal 605 (data_in) indicates whether the input of the data from the data input unit 101 is valid. If a value of the valid_in is "1", this indicates that the data input is valid, while if this value is "0", this indicates that the data input is invalid.

The stall counter 606 counts the number of times the value "1" of the stall flag 202 of the data packet input from the ring bus 114 is consecutive during a plurality of clock cycles. The stall counter 606 counts up while the value of the enable signal from the data control unit 601 is "1". When the value of the enable signal is "0", the value of the stall counter 606 is cleared to "0". However, in the present exemplary embodiment, as illustrated in FIG. 1, since the number of data packets which can be stored in the ring bus 114 is 6, when the value of the stall counter 606 reaches "6", the counting up is stopped. Further, the counter value is read from the control unit 115 via a counter value output signal 607. The counter value output signal 607 is also input into the data control unit 601, and used in the generation of the enable signals for the packet counters 609, 612, 615, and 618 described below.

In the present exemplary embodiment, the same number of the standby ID registers 608, 611, 614, and 617 are provided as the number of the data processing units of the data processing apparatus. The data packet counters 609, 612, 615, and 618 count the number of data packets matching the IDs set respectively for the standby ID registers 608, 611, 614, and 617 during a deadlock. Counting up is performed when the value of the enable signal from the data control unit 601 is "1". Further, count values of the respective counters are read by the control unit 115 via control signals 610, 613, 616, and 619. The control signal 117 illustrated in FIG. 1 is expressed as a single line by simplifying a detailed signal group of the counter value output signal 607, the control signals 610, 613, 616, and 619, and the like.

Figure 7:
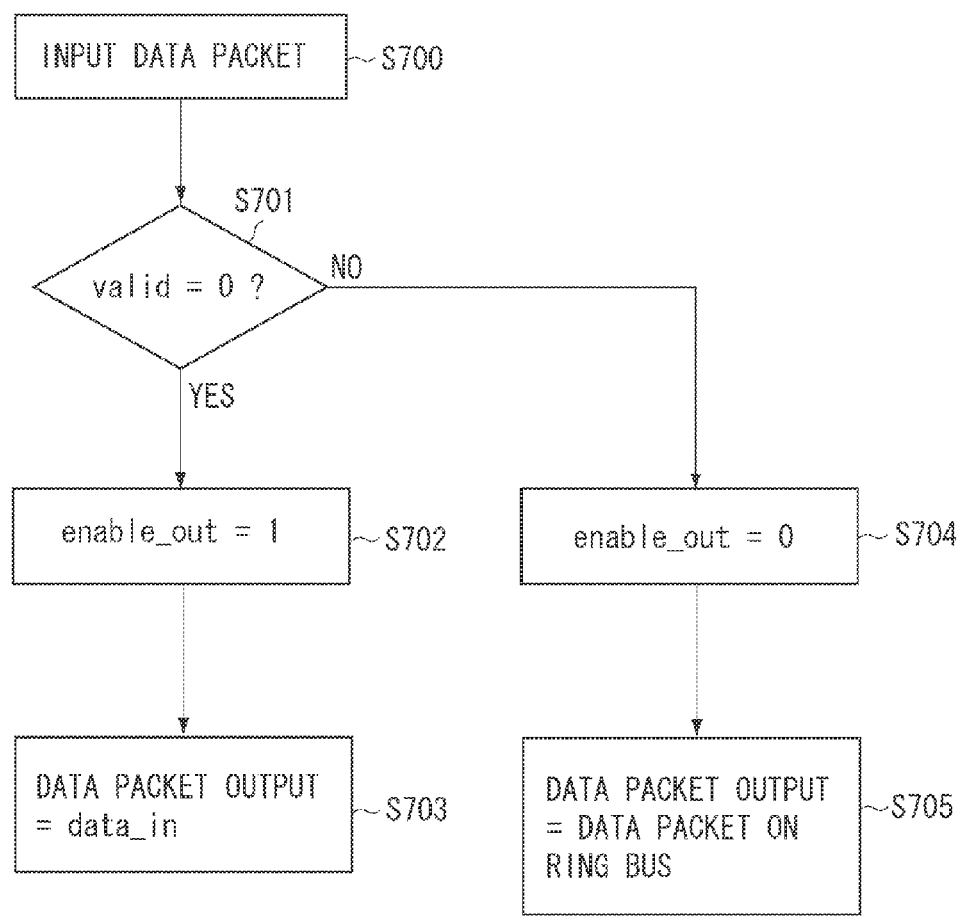
FIG. 7 is a flowchart illustrating an operation performed by a communication processing unit.

The operation performed by the communication processing unit 108 will now be described with reference to FIG. 7. In step S700, the data packet is input from the ring bus 114 into the data packet input terminal 600. In step S701, when the value of the valid flag 201 is "0" (YES in step S701), the data packet can be input from the data input unit 101. Therefore, in step S702, the communication processing unit 108 sets the value of the data request signal 310 (enable_out) to "1". Then, in step S703, the communication processing unit 108 outputs the data packet from the data input unit 101 to the data packet output terminal 603 via the flip-flop 602. On the other hand, when the value of the valid flag 201 is "1" (NO in step S701), the data packet from the ring bus 114 has priority. Therefore, in step S704, the communication processing unit 108 sets the value of the data request signal 310 (enable_out) to "0". Then, in step S705, the communication processing unit 108 outputs the data packet from the ring bus 114 to the data packet output terminal 603 via the flip-flop 602. The operations of the stall counter 606 and the packet counters 609, 612, 615, and 618 are described above, and thus a description will be omitted here.

Figure 8:
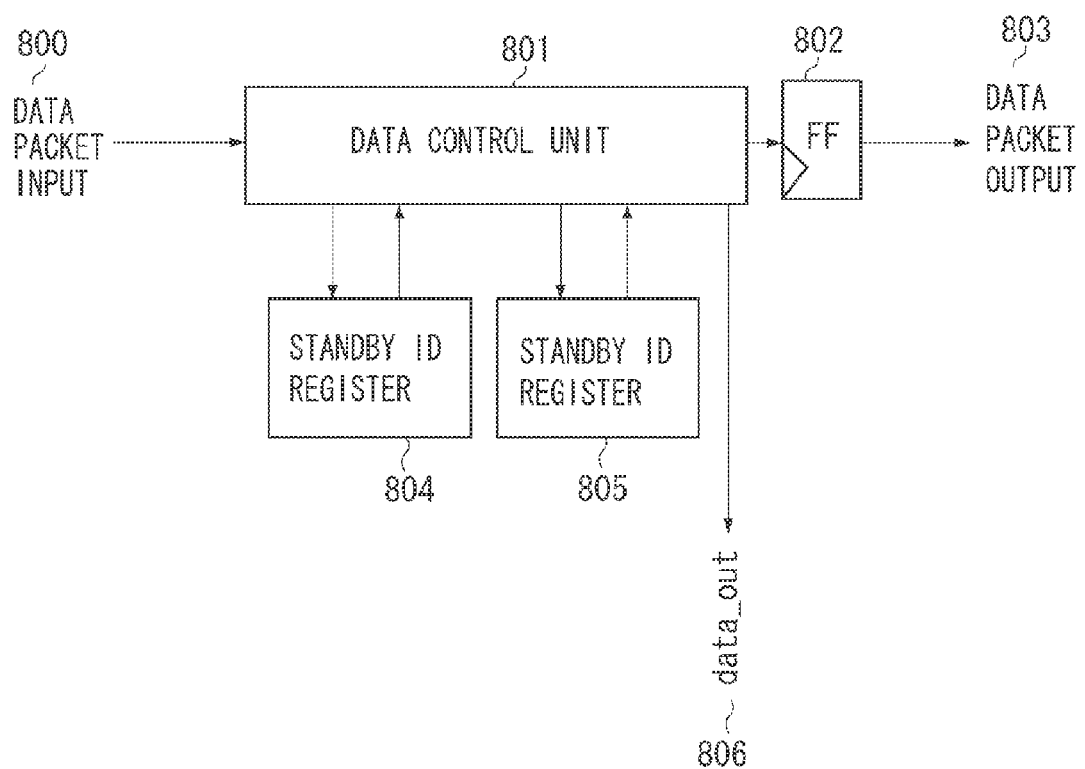
FIG. 8 illustrates a configuration of a communication processing unit.

FIG. 8 illustrates a configuration of the communication processing unit 113 which is an example of a first communication processing unit. The communication processing unit 113 includes a data packet input terminal 800 and a data control unit 801. The data control unit 801 outputs the data packet input from the ring bus 114 to a flip-flop 802 or to a data packet output terminal 803 which are described below. The flip-flop 802 stores the data packet from the data control unit 801. The data packet output terminal 803 outputs the data packet to the ring bus 114. Standby ID registers 804 and 805 store the ID 203 of the data packet to be output to the data output unit 106. A data output signal 806 (data_out) is used to output the data packet to the data output unit 106. The number of provided standby ID registers corresponds to the maximum number of processes that can be handled by the data processing apparatus. In the present exemplary embodiment, since a maximum of two processes can be handled, the data processing apparatus has two standby ID registers 804 and 805.

Figure 9:
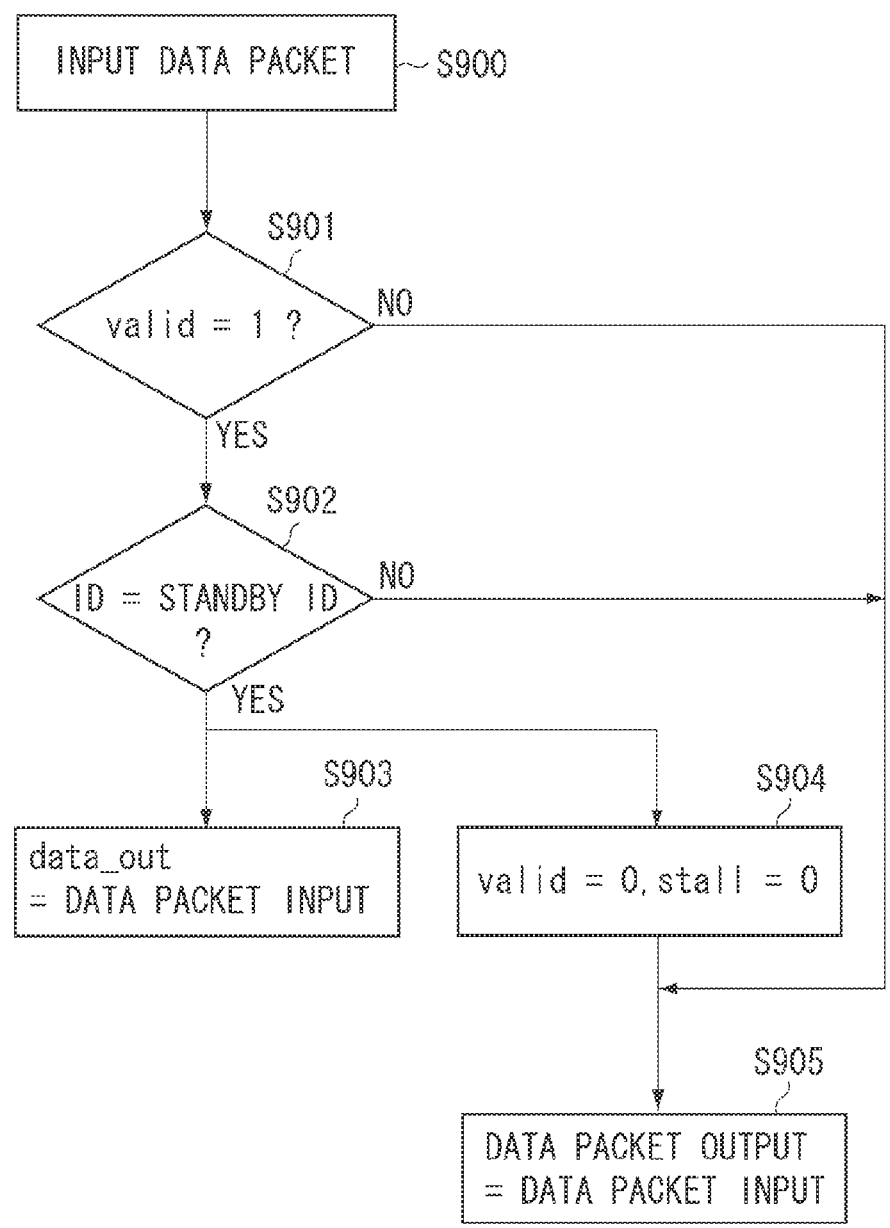
FIG. 9 is a flowchart illustrating an operation performed by a communication processing unit.

The operation performed by the communication processing unit 113 will be described below with reference to FIG. 9. As initial settings, the standby ID registers 804 and 805 are set in advance by the control unit 115 to a value which is based on the data flow (process).

In step S900, the data packet is input from the data packet input terminal 800. In step S901, the communication processing unit 113 evaluates the valid flag 201 of the data packet. If the value of the valid flag 201 is "1" (YES in step S901), the communication processing unit 113 determines that the data of the data packet is valid, and the processing proceeds to step S902. On the other hand if the value of the valid flag 201 is "0", the communication processing unit 113 determines that the data is invalid, and the processing proceeds to step S905. In step S905, the communication processing unit 113 outputs the data packet input from the data packet input terminal 800 as it is to the data packet output terminal 803 via the flip-flop 802.

In step S902, the communication processing unit 113 compares the value of the ID 203 of the data packet with the values of the standby ID registers 804 and 805 to determine whether the data packet includes data to be output to the data packet output terminal 803. If the values of the ID 203 of the data packet and the standby ID registers match (YES in step S902), the communication processing unit 113 determines that the data packet is to be output, and the processing proceeds to step S903. In step S903, the communication processing unit 113 outputs the data packet to the data packet output terminal 803. Further, in step S904, the communication processing unit 113 sets the valid flag 201 and the stall flag 202 of the data packet to "0". Then, in step S905, the communication processing unit 113 outputs the empty data packet to the data packet output terminal 803 via the flip-flop 802. On the other hand, if the values of the ID 203 of the data packet and the standby ID registers do not match (NO in step S902), the processing proceeds to step S905. In step S905, the communication processing unit 113 outputs the data packet input from the data packet input terminal 800 as it is to the data packet output terminal 803 via the flip-flop 802.

Figure 10:
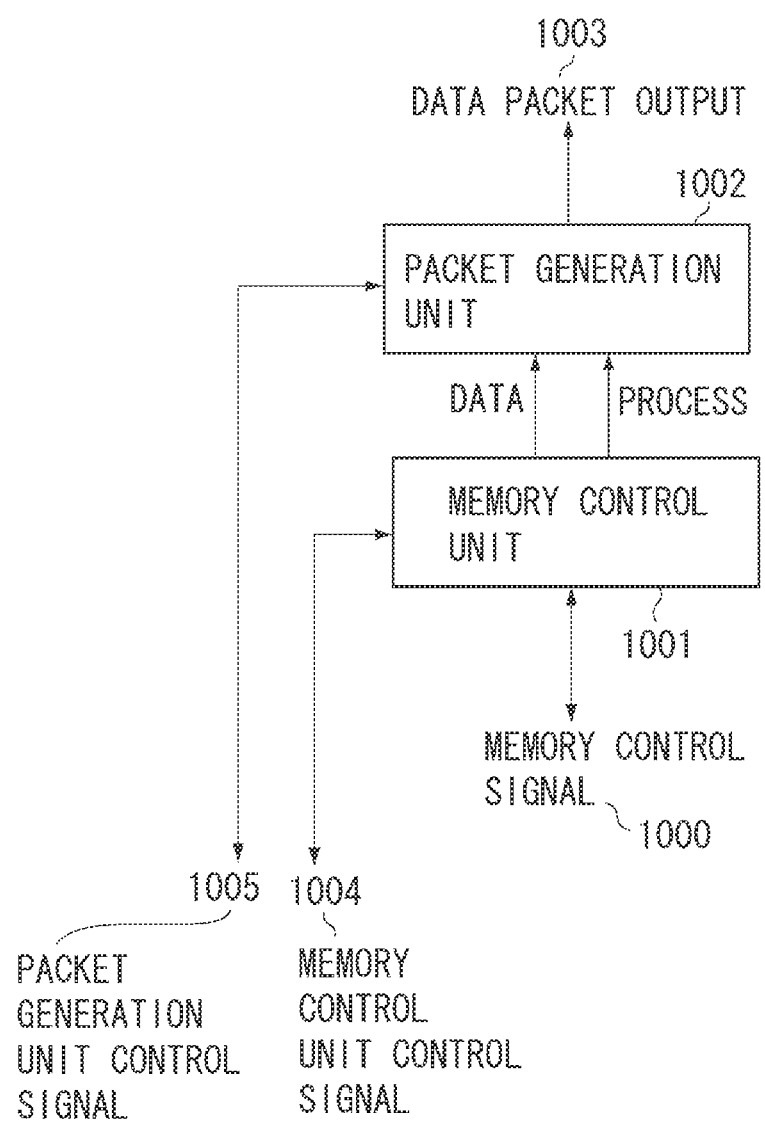
FIG. 10 illustrates a configuration of a data input unit.

FIG. 10 illustrates a configuration of the data input unit 101. A memory control signal 1000 is used for reading input data from the memory 100. A memory control unit 1001 controls the memory 100. A packet generation unit 1002 generates a data packet. A data packet output terminal 1003 outputs the data packet to the communication processing unit 108. A memory control unit control signal 1004 is used for controlling the memory control unit 1001 from the control unit 115. A packet generation unit control signal 1005 is used for controlling the packet generation unit 1002 from the control unit 115. The control signal 116 illustrated in FIG. 1 is expressed as a single line by simplifying a detailed signal group of the memory control unit control signal 1004, the packet generation unit control signal 1005, and the like.

The operation performed by the data input unit 101 will now be described. First, according to the control from the control unit 115, an address area in which the data of the two processes (hereinafter, referred to as "process a" and "process b") handled in the present exemplary embodiment is stored in the memory 100 is set to the memory control unit 1001 via the memory control unit control signal 1004. Further, the ID 203 to be set to the data corresponding to the process a or the process b during packet generation is set to the packet generation unit 1002 via the packet generation unit control signal 1005. Subsequently, the memory control unit 1001 is notified of the start of processing from the control unit 115 via the memory control unit control signal 1004. The memory control unit 1001 reads the data from a predetermined address in the memory 100, and outputs that data and a process name corresponding to the address to the packet generation unit 1002. The packet generation unit 1002 sets a predetermined ID 203 and the data from the process name, generates a data packet, and outputs the generated data packet to the data packet output terminal 1003.

Figure 11:
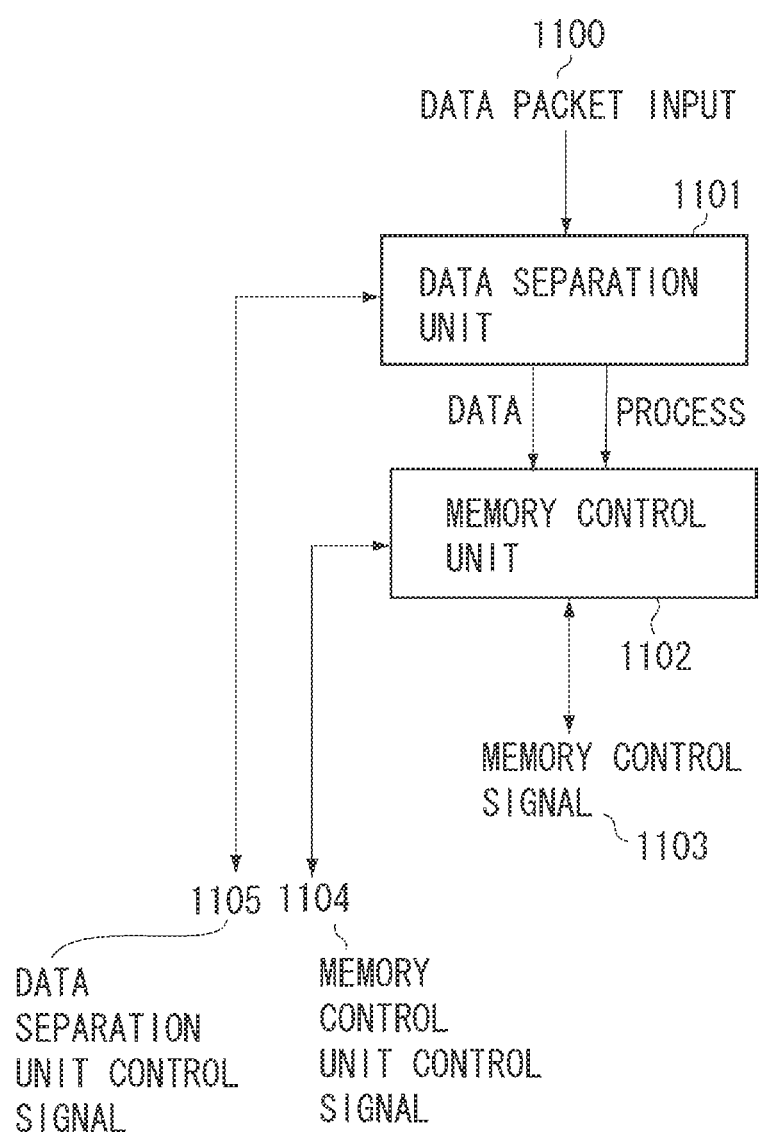
FIG. 11 illustrates a configuration of a data output unit.

FIG. 11 illustrates a configuration of the data output unit 106. A data packet input terminal 1100 is an input terminal from the communication processing unit 113. A data separation unit 1101 separates data from the input data packet. A memory control unit 1102 performs write control of the data to the memory 107. A memory control signal 1103 is connected to the memory 107. A memory control unit control signal 1104 is used for controlling the memory control unit 1102 from the control unit 115. A data separation unit control signal 1105 is used for controlling the data separation unit 1101 from the control unit 115. The control signal 118 illustrated in FIG. 1 is expressed as a single line by simplifying a detailed signal group of the memory control unit control signal 1104, the data separation unit control signal 1105, and the like.

The operation performed by the data output unit 106 will now be described. First, according to the control from the control unit 115, the ID 203 of a data packet for which the processing of the process a or the process b has finished is set to the data separation unit 1101 via the data separation unit control signal 1105. Then, which address area in the memory 107 the data of the process a and the data of the process b are stored is set in the memory control unit 1102 via the memory control unit control signal 1104. Subsequently, each time a data packet is input to the data packet input terminal 1100, the data separation unit 1101 separates the data from the data packet, and associates the ID 203 of the data packet with the process a or the process b. Then, the data separation unit 1101 outputs the data and the process name thereof to the memory control unit 1102. The memory control unit 1102 writes the data in a desired address area of the memory 107 based on the process name.

A recovery operation from a deadlock state of the data processing apparatus will now be described with reference to FIG. 12. In step S1200, the control unit 115 performs deadlock state detection. As described above, if the value of the stall counter 606 of the data input unit 101 is "6", since the ring bus 114 has the data packet with the stall flag 202 of "1", the control unit 115 determines that the data processing unit is in the deadlock state.

If the deadlock state is detected, the control unit 115 temporarily stops the input of the data packet from the data input unit 101, and in step S1201, determines a data path to be reset in order to discard the process. The determination of the reset data path is performed by the control unit 115 referring to each of the values of the packet counters 609, 612, 615, and 618 of the communication processing unit 108 via the control signals 610, 613, 616, and 619. In the present exemplary embodiment, the control unit 115 determines that the data packet relating to the ID 203 having a large count value is the main cause for the deadlock. In order to discard the process that outputs the data packet relating to that ID 203, the corresponding data path is reset.

In step S1202, the control unit 115 resets the data path determined in step S1201. The reset operation is performed from the control unit 115 by setting the desired reset signal of the reset signals (120, 121, 122, and 123) to a value "1". The operations performed by the communication processing units (109, 110, 111, and 112) at the time of resetting are as described in FIGS. 4 and 5. The data packet relating to the process to be discarded is deleted by the reset operation of the desired communication processing unit. At this stage, the data output from the data processing unit connected to the desired communication processing unit is discarded by the communication processing unit. However, when there are large amounts of data pieces output from the data processing unit, for example if the process to be discarded is an enlargement process, and the discarding of that data will take many clock cycles, that data pieces are correctively discarded by performing the reset operation on the data processing unit too. Although the input counter 303 and the output counter 309 of the communication processing unit into which the reset signal was input are reset, the standby ID register 302 and the output ID register 308 are remained as it is without being reset.

In step S1203, the control unit 115 releases the reset operation. Reset signal assertion is performed for one clock cycle of the data packet on the ring bus 114. In the present exemplary embodiment, the reset signal assertion is performed for six clock cycles or more.

In step S1204, the control unit 115 sets (clears) the values of the packet counters 609, 612, 615, and 618 of the communication processing unit 108 to "0" via the control signals 610, 613, 616, and 619. Then, the data processing apparatus restarts data packet input from the data input unit 101. However, when the process discarded from step S1200 to step S1203 is executed again from the start, the data processing apparatus performs a data path initial setting, and then restarts the data packet input. Further, regarding the data path of the process that is not discarded, the data processing apparatus just restarts the input of the data packets without performing any other processing.

In order to prevent the deadlock state from occurring again after the input of the data packet is restarted, the control unit 115 performs control to restrict the number of data packets input into the data input unit 101 from the data input unit 101.

The control unit 115 may also perform control to restrict the number of data packets of the process which caused the deadlock state in the data input unit 101.

According to such a configuration, recovery to the normal operation can be achieved without discarding all the processes, even if the deadlock state occurs on the ring bus 114. Further, loss of processing time can be greatly suppressed (sometimes to the minimum possible). In addition, recurrence of the deadlock state can be prevented.

Figure 13:
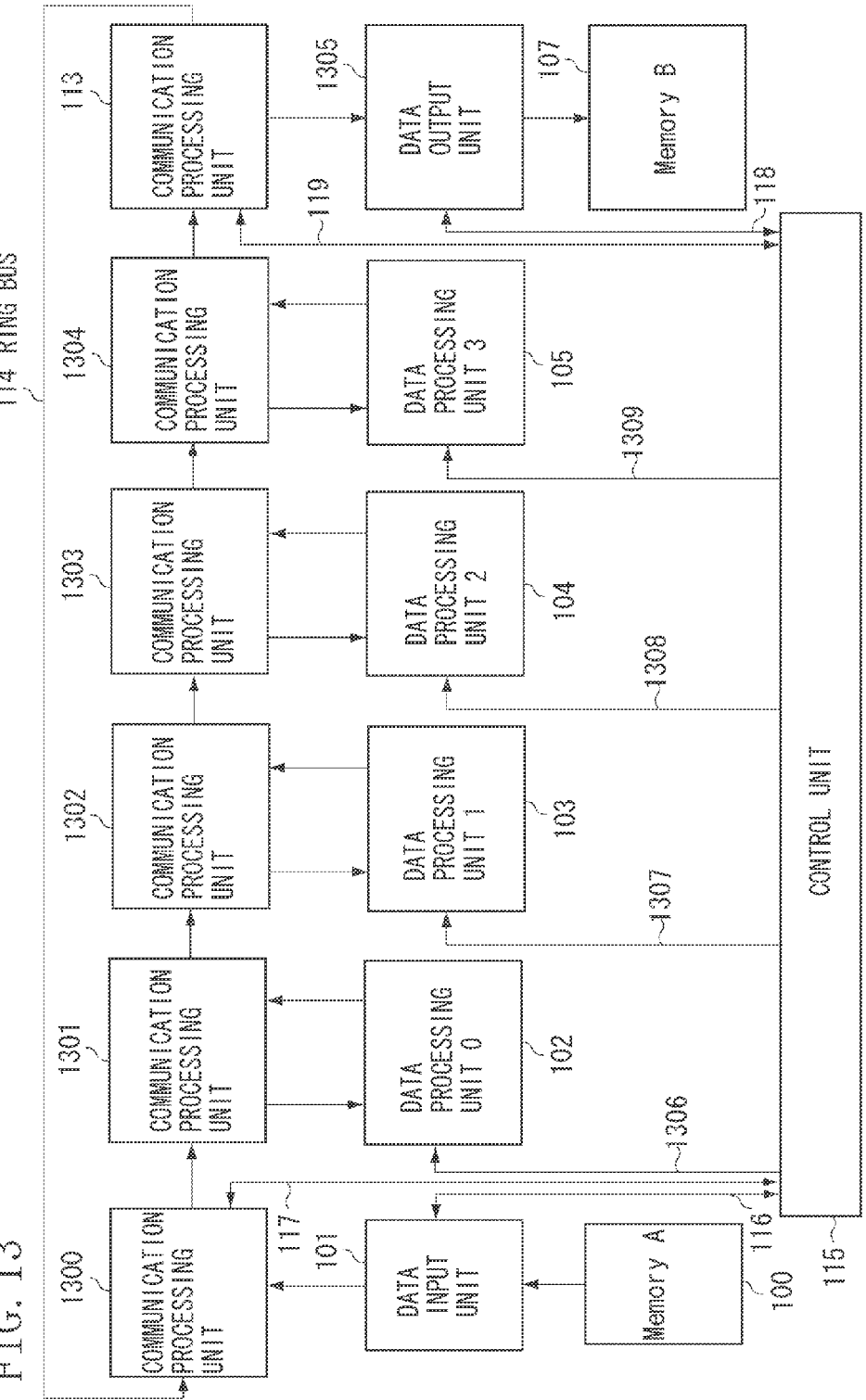
FIG. 13 illustrates a configuration of a data processing apparatus.

FIG. 13 illustrates a configuration of a data processing unit according to another exemplary embodiment. Components and functions of the data processing unit which are the same as those in the first exemplary embodiment illustrated in FIG. 1 are denoted with the same reference numerals, and thus descriptions thereof are omitted here. Main differences from the first exemplary embodiment are communication processing units 1300 to 1304 which control the flow of data packets, a data destination unit 1305, and reset signals 1306 to 1309. In the configuration illustrated in FIG. 1, the reset signal from the control unit 115 is also input to the communication processing unit. However, in the present exemplary embodiment, the reset signal is only input to the data processing unit. The format of the data packet is the same as that illustrated in FIG. 1 (FIG. 2), and thus a description thereof is omitted here.

Figure 14:
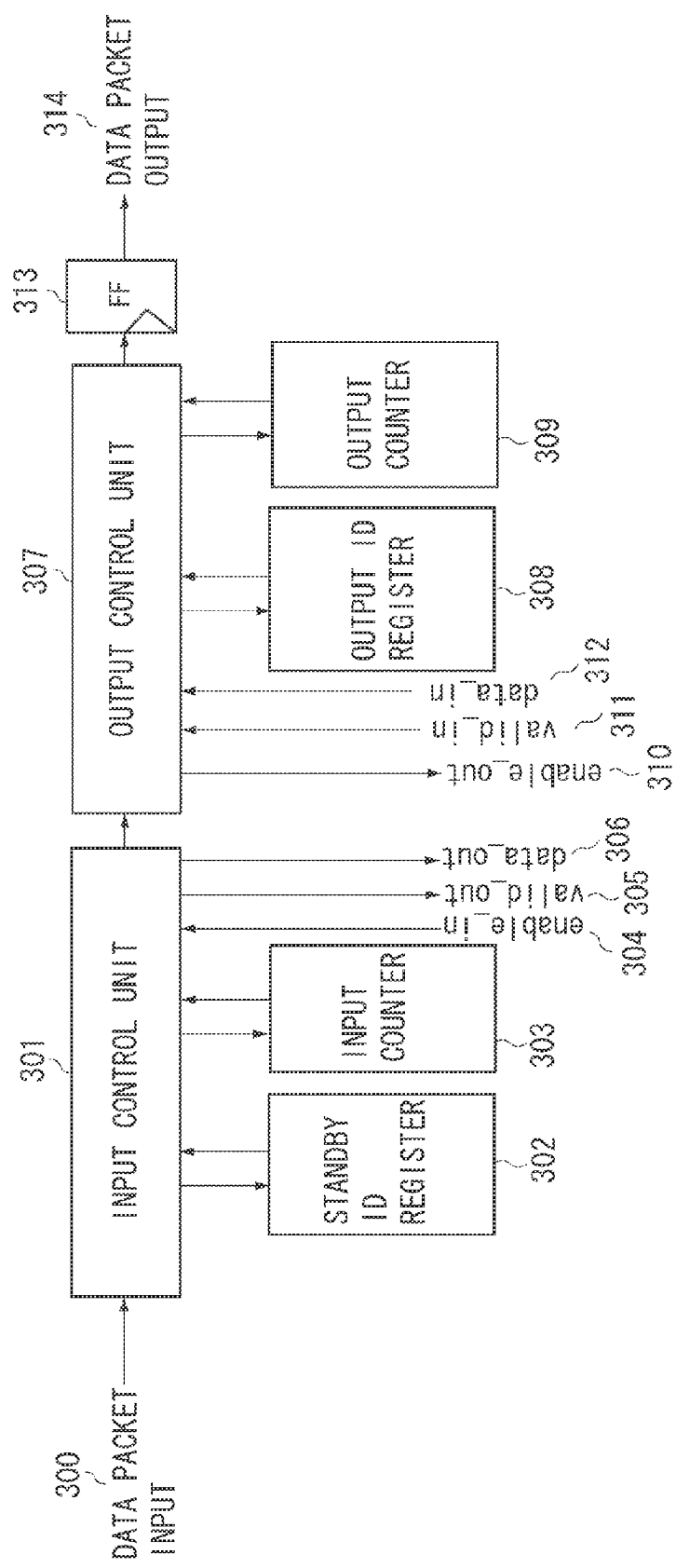
FIG. 14 illustrates a configuration of a communication processing unit.

FIG. 14 illustrates a configuration of the communication processing units 1301 to 1304. Regarding the respective components, functions which are the same as those of the data processing apparatus according to the first exemplary embodiment are denoted with the same reference numerals as used in FIG. 3, and thus descriptions thereof are omitted here. The main difference from the first exemplary embodiment is that the reset signal 315 is deleted. In the present exemplary embodiment, the operation for deleting the data of the data packet when resetting is performed by the data processing unit. Therefore, the reset signal is not input to the input control unit 301. Further, in the recovery operation from a deadlock state, the resetting of the data path is performed by the control unit 115. At that stage, the input counter 303 and the output counter 309 are simultaneously initialized to a value of "0". Therefore, the reset signal is not input into either counter.

Figure 15:
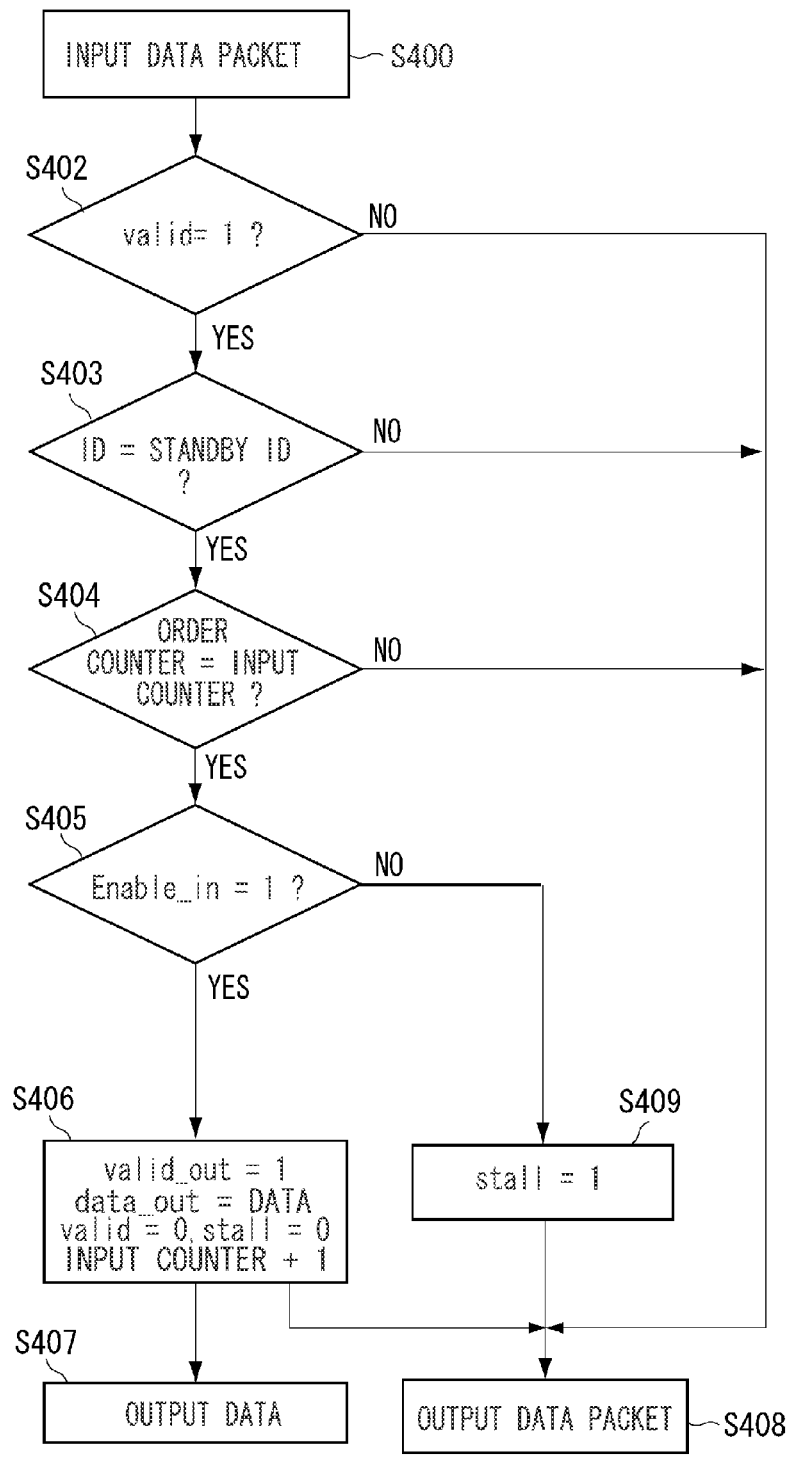
FIG. 15 is a flowchart illustrating an operation performed by an input control unit.
Figure 16:
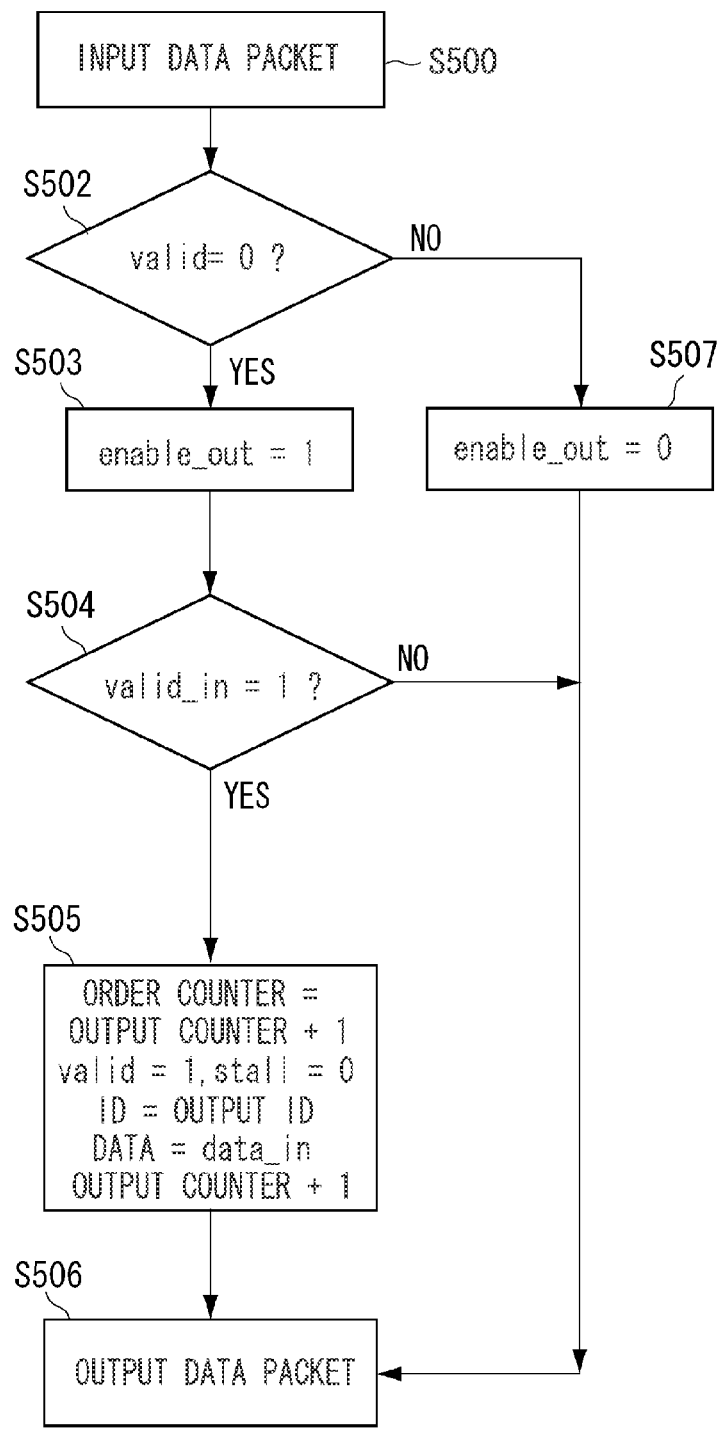
FIG. 16 is a flowchart illustrating an operation performed by an output control unit.

Operations performed by the communication processing units (1301, 1302, 1303, and 1304) will now be described with reference to FIGS. 15 and 16. As the initial settings, the standby ID register 302 and the output ID register 308 are set by the control unit 115, and the input counter 303 and the output counter 309 are ser (reset) to "0". Further, because the input side controlled by the input control unit 301 and the output side controlled by the output control unit 307 are independently operated, their respective operations will be described separately.

First, the operation performed on the input side will be described below with reference to FIG. 15. Regarding the respective steps, steps executing the same operations as are described using FIG. 4 are denoted with the same reference numerals, and thus descriptions thereof are omitted here. The main differences from the first exemplary embodiment are the operations performed at the time of resetting, namely steps S401, S410, S411, and S412 are omitted.

During the reset operation performed by the data processing unit, as the operation for deleting data, the input control unit 301 receives the data in which the enable_in in step S405 is constantly set to "1". As will be described below, the processed data is not output to the communication processing unit. Further, the input control unit 301 then performs the processing in step S406, outputs an empty data packet including the valid flag 201 and the stall flag 202 value of "0" to the output control unit 307, and deletes the data packet.

Next, the operation performed on the output side will be described below with reference to FIG. 16. Regarding the respective steps, steps executing the same operations as are described using FIG. 5 are denoted with the same reference numerals, and thus descriptions thereof are omitted here. The main differences from the first exemplary embodiment are the operations performed at the time of resetting, namely steps S501 and S508 are omitted.

During the reset operation performed by the data processing unit, as the operation for deleting data, the output control unit 307 does not output the data since the valid_in in step S504 is constantly set to "0". Further, the output control unit 307 then performs the processing in step S506, and in conjunction with the above described input side operation, outputs an empty data packet including the valid flag 201 and the stall flag 202 value of "0" to the data packet output terminal 314 via the flip-flop 313.

Figure 17:
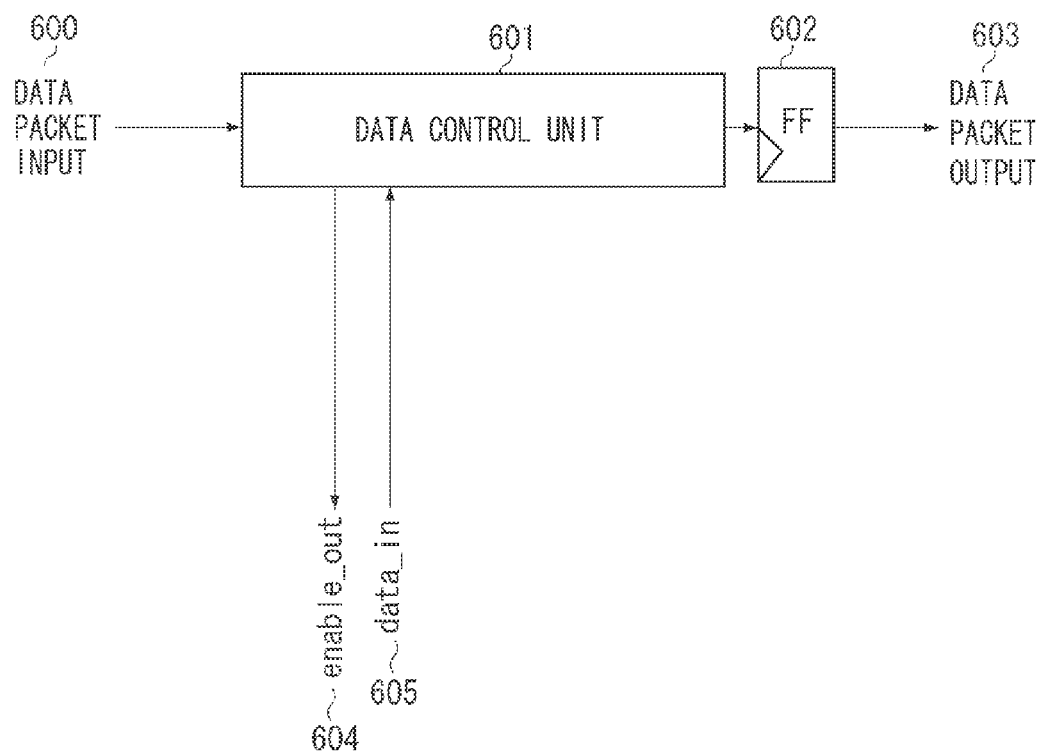
FIG. 17 illustrates a configuration of a communication processing unit.

FIG. 17 illustrates a configuration of the communication processing unit 1300. Regarding the respective components, functions which are the same as those of the data processing apparatus illustrated in FIG. 6 are denoted with the same reference numerals as used in FIG. 6, and thus descriptions thereof are omitted here. Further, since the operation performed by the communication processing unit 1300 is the same as that described using FIG. 7, the description thereof is omitted here.

Figure 18:
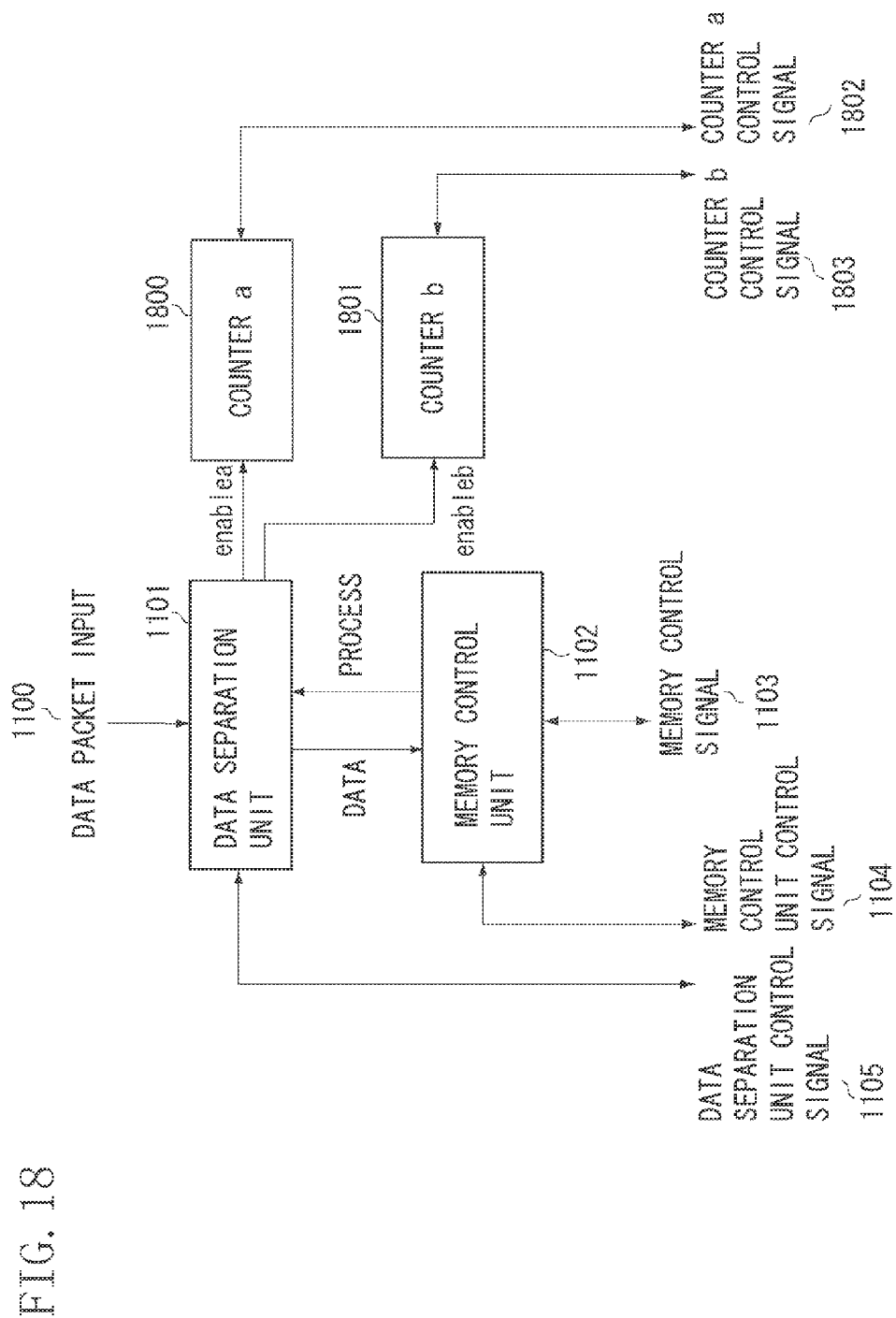
FIG. 18 illustrates a configuration of a data output unit.

FIG. 18 illustrates a configuration of the data output unit 1305. Regarding the respective components, functions which are the same as those of the data processing apparatus illustrated in FIG. 11 are denoted with the same reference numerals as used in FIG. 11, and thus descriptions thereof are omitted here. The main difference from the data processing apparatus illustrated in FIG. 11 is that counters a 1800 and b 1801 and control signals 1802 and 1803 are added.

The counter a 1800 counts the data packets of the input process a. The counter b 1801 counts the data packets of the input process b. The counter a control signal 1802 is used for controlling the counter a 1800 from the control unit 115. The counter b control signal 1803 is used for controlling the counter b 1801 from the control unit 115. The number of provided counters corresponds to the maximum number of processes that can be handled by the data processing apparatus. In the present exemplary embodiment, since a maximum of two processes can be handled, the data processing apparatus has two counters a 1800 and b 1801. The control signal 118 illustrated in FIG. 13 is expressed as a single line by simplifying a detailed signal group of the data separation unit control signal 1105, the memory control unit control signal 1104, the counter control signals a 1802 and b 1803, and the like.

The operation performed by the data output unit 1305 will now be described. As described above using FIG. 11, first, according to the control from the control unit 115, the ID 203 of the data packet for which the processing of the process a or the process b has finished is set to the data separation unit 1101 via the data separation unit control signal 1105. Then, which address area in the memory 107 the data of the process a and the data of the process b are stored is set in the memory control unit 1102 via the memory control unit control signal 1104.

Further, the counters a 1800 and b 1801 are each set (cleared) to a value of "0" via the counter control signals a 1802 and b 1803. Subsequently, each time a data packet is input to the data output unit 1305, the data separation unit 1101 separates the data from the data packet, and associates the ID 203 of the data packet with the process a or the process b.

Then, the data output unit 1305 outputs the data and the process name to the memory control unit 1102. At this stage, the counters a 1800 and b 1801 are counted up each time the data packet of each process is input. Further, the control unit 115 can read the respective values of the counters a 1800 and b 1801 via the counter control signals a 1802 and b 1803. Then, the memory control unit 1102 writes the data in a desired address area of the memory 107 based on the process name.

A recovery operation from the deadlock state of the data processing apparatus according to the present exemplary embodiment will now be described. The recovery operation is performed based on the flowchart illustrated in FIG. 12. Therefore, here, the processing which is different in the respective steps will be described.

First, in step S1200, the control unit 115 performs deadlock state detection. As a detection method, the control unit 115 measures the values of the counters a 1800 and b 1801 in the data output unit 1305 by a timer (not illustrated) in the control unit 115. If there is no change for a predetermined period, the control unit 115 determines as the deadlock state.

Figure 12:
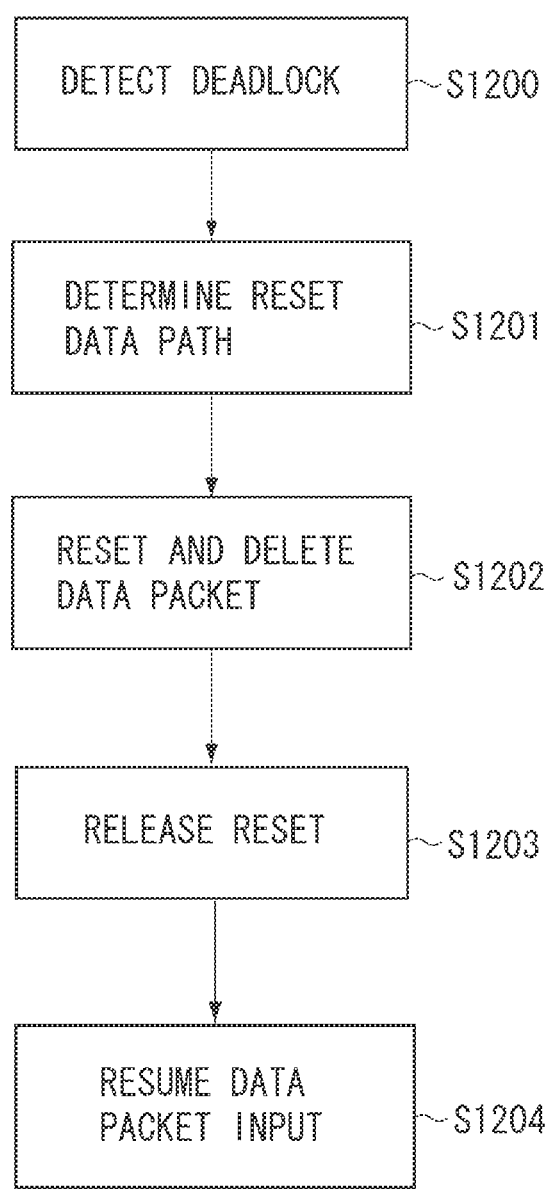
FIG. 12 is a flowchart illustrating a recovery operation from a deadlock state.

Similarly to FIG. 12, when the deadlock state is detected in step S1200, the control unit 115 temporarily stops the input of the data packet from the data input unit 101. Then in step S1201, the control unit 115 determines the data path to be reset in order to discard the process.

The determination of the reset data path is performed by either of the following two methods.

(1) If the number of data packets input from the data input unit 101 and the number of data packets output from the data output unit 1305 is the same, and if there is no increase or decrease in the data amount, the control unit 115 references the value of each of the counter a 1800 and b 1801 in the data output unit 1305. Then, the control unit 115 determines (resets) the corresponding data path to discard the process with the smallest value, namely the process which has progressed the least. The control unit 115 references each value via the counter control signals a 1802 and b 1803.

(2) If there is a process which includes processing in which the data amount increases by the data processing unit, such as the enlargement processing, the control unit 115 determines that this process is the main reason for the deadlock. Thus, the control unit 115 determines (resets) the corresponding data path (the data path of the process including the data processing unit having the largest ratio of increasing output data).

Next, in step S1202, the control unit 115 resets the data path determined in step S1201. The reset operation is performed from the control unit 115 by setting the desired reset signal of the reset signals (1306, 1307, 1308, and 1309) to a value "1". The operations performed by the communication processing units (1301, 1302, 1303, and 1304) and the data processing units (102, 103, 104, and 105) at the time of resetting are as described in FIGS. 15 and 16. For example, the data packet of the process to be discarded is deleted by the reset operation of the desired data processing unit.

The processing of step S1203 and onwards is the same as the flowchart in FIG. 12, and thus the description thereof is omitted here.

In addition to the above described methods for determining the data path to be reset in step S1201, the recovery operation from the deadlock state may also be performed by having the control unit 115 reset the data path for the lowest priority process.

In the above exemplary embodiments, a case is described in which processing for two processes is performed. However, the present invention is not limited to this case. For example, even for three or more processes, the data processing apparatus can be recovered from the deadlock state by generating an empty data packet in the data processing apparatus by discarding at least one process.

Thus, the control unit 115 generates an empty data packet on the ring bus 114 by resetting only the data path relating to the process which is the cause of the deadlock state, the process whose processing has not progressed compared with the other processes, the process with the lowest priority and the like. According to this configuration, recovery to the normal operation can be achieved by canceling only a desired process without discarding all the processes, even if the deadlock state occurs on the ring bus 114 during processing of a plurality of processes (data paths). Further, according to this configuration, the loss of processing time can be greatly suppressed (sometimes to the minimum possible).

Aspects of the present invention can also be realized by a computer of a system or apparatus (or devices such as a central processing unit (CPU), micro-processing unit (MPU) and/or the like) that reads out and executes a program recorded on a memory device to perform the functions of the above described embodiment(s), and by a method, the steps of which are performed by a computer of a system or apparatus by, for example, reading out and executing a program recorded on a memory device to perform the functions of the above described embodiment(s). For this purpose, the program is provided to the computer for example via a network or from a recording medium of various types serving as the memory device (e.g., computer-readable storage medium).

In the above described exemplary embodiments a valid flag indicating whether a packet is valid is used. However, a packet length may be shortened by setting a specific connection ID (e.g., "0") as an invalid packet (corresponding to the valid flag "0"). Further, externally acquired data may be input as it is in a packet format that is handled by the ring bus 114. In addition, the processing unit may be configured so that it can interpret the packet and process the packet as it is.

The schematic configuration diagrams of the units in the data processing apparatus used in the above described exemplary embodiments are meant to illustrate the connection relationship among the circuits and functional units. These schematic configuration diagrams in no way limit the positional relationship or the number of the components. For example, three or more communication units (including the input and output units) may be used to realize the present invention. In addition, two or more processing units (processing modules) may be used. Moreover, the processing module may be formed as separate chips, or as a single chip. The same applies for the data processing units and the communication units. Obviously, the configuration of the present invention may be formed as one chip.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-165921 filed Jul. 14, 2009, which is hereby incorporated by reference herein in its entirety.

What is claimed is:

1. A data processing apparatus configured to execute at least two processes of data paths, each data path meaning a sequential process on data, the data processing apparatus comprising:
 a plurality of data processing units configured to perform data processing;
 a plurality of communication processing units connected by a ring bus, wherein at least one of the plurality of communication processing units is directly connected to at least one of the plurality of data processing units; and
 a control unit configured to independently perform a reset operation on at least one of the plurality of communication processing units for restricting at least one of the plurality of data paths,
 wherein each of the plurality of communication processing units controls transmission and reception of data for at least one corresponding data processing unit,
 wherein the control unit determines a data path to be restricted among the plurality of data paths and performs a reset operation on at least one of the plurality of communication processing units associated with only the determined data path to be restricted,
 wherein each of the plurality of communication processing units is assigned an identification (ID) different from each other,
 wherein each data is assigned identification information,
 wherein each of the plurality of communication processing units determines whether received data is to be processed by the corresponding data processing unit based on the identification information with the received data and the assigned ID, and
 wherein each of the plurality of communication processing units, after performing the reset operation by the control unit, determines whether received data is to be invalidated based on the identification information with the received data and the assigned ID.

2. The data processing apparatus according to claim 1, wherein each of the plurality of communication processing units further comprises a holding unit configured to hold a count value, and
 wherein the holding unit is configured to hold, as a count value, a number of times each of the plurality of communication processing units determines that the received data is to be processed and the received data is transferred to the corresponding data processing unit.

3. The data processing apparatus according to claim 2, wherein the control unit is configured to perform the reset operation by initializing the count value without changing the identification of the plurality of communication processing units associated with only the determined path to be restricted.

4. The data processing apparatus according to claim 1, wherein the control unit continues the reset operation while data goes at least once around the ring bus.

5. The data processing apparatus according to claim 1, wherein the plurality of communication processing units on which the reset operation is performed by the control unit discards the data received from the at least one communication processing unit.

6. The data processing apparatus according to claim 1, wherein each of the communication processing units on which the reset operation is performed by the control unit invalidates the received data in a case where the identification information with the received data matches the assigned ID.

7. The data processing apparatus according to claim 6, wherein the control unit prevents a deadlock state on the ring bus by restricting at least one of the plurality of data paths.

8. A method for performing data processing by data processing apparatus configured to execute at least two processes of data paths, each data path meaning a sequential process on data, a plurality of data processing units configured to perform data processing, and a plurality of communication processing units connected by a ring bus, wherein at least one of the plurality of communication processing units are directly connected to at least one of the plurality of data processing units, the method comprising:
 independently performing a reset operation on at least one of the plurality of communication processing units for restricting at least one of the plurality of data paths;
 controlling, by each of the plurality of communication processing units, transmission and reception of the data for at least one corresponding data processing unit;
 determining a data path to be restricted among the plurality of data paths and performing a reset operation on at least one of the plurality of communication processing units associated with only the determined data path to be restricted;
 assigning each of the plurality of communication processing units an identification (ID) different from each other;
 assigning each data identification information;
 determining, by each of the plurality of communication processing units, whether received data is to be processed by the corresponding data processing unit based on the identification information with the received data and the assigned ID; and
 after performing the reset operation, each of the plurality of communication processing units determines whether received data is to be invalidated based on the identification information with the received data and the assigned ID.

9. The method according to claim 8, wherein the identification is a count value.

10. The method according to claim 8, further comprising continuing the reset operation while data goes at least once around the ring bus.

11. The method according to claim 8, further comprising:
 transferring the data, by the plurality of communication processing units, to at least one corresponding data processing unit according to a result of determination whether received data is to be processed by the at least one corresponding data processing unit; and
 wherein the at least one communication processing unit on which the reset operation is performed by the control unit invalidates the received data in a case where it is determined that the received data is to be processed by the corresponding data processing unit.

12. The method according to claim 11, further comprising preventing a deadlock state on the ring bus by restricting at least one of the plurality of data paths.

13. The method according to claim 8,
 wherein the plurality of communication processing units transfers the data to the at least one corresponding data processing unit according to a result of determination whether received data is to be processed by the at least one corresponding data processing unit, and
 wherein the at least one communication processing unit on which the reset operation is performed by the control unit discards the data received from the at least one communication processing unit.

* * * * *